(12) United States Patent
Mihori et al.

(10) Patent No.: US 11,932,733 B2
(45) Date of Patent: Mar. 19, 2024

(54) PHENOLIC RESIN FOAM LAMINATE BOARD

(71) Applicant: Asahi Kasei Construction Materials Corporation, Tokyo (JP)

(72) Inventors: Hisashi Mihori, Tokyo (JP); Narumi Miyata, Tokyo (JP); Nobuki Hiramatsu, Tokyo (JP)

(73) Assignee: Asahi Kasei Construction Materials Corporation, Tokyo (JP)

( * ) Notice: Subject to any disclaimer, the term of this patent is extended or adjusted under 35 U.S.C. 154(b) by 0 days.

(21) Appl. No.: 17/759,934

(22) PCT Filed: Feb. 5, 2021

(86) PCT No.: PCT/JP2021/004337
§ 371 (c)(1),
(2) Date: Aug. 2, 2022

(87) PCT Pub. No.: WO2021/157698
PCT Pub. Date: Aug. 12, 2021

(65) Prior Publication Data
US 2023/0074052 A1    Mar. 9, 2023

(30) Foreign Application Priority Data

Feb. 6, 2020 (JP) .................. 2020-019158
May 22, 2020 (JP) .................. 2020-089399

(51) Int. Cl.
*C08G 8/10* (2006.01)
*B32B 5/02* (2006.01)
(Continued)

(52) U.S. Cl.
CPC ................ *C08G 8/10* (2013.01); *B32B 5/022* (2013.01); *B32B 5/20* (2013.01); *B32B 5/245* (2013.01); *B32B 29/007* (2013.01); *C08J 9/141* (2013.01); *B32B 2266/0285* (2013.01); *B32B 2266/08* (2013.01); *B32B 2307/304* (2013.01); *B32B 2307/72* (2013.01); *B32B 2307/748* (2013.01); *C08J 2361/10* (2013.01)

(58) Field of Classification Search
CPC ........ B32B 2266/0285; B32B 2266/08; B32B 2307/304; B32B 2307/72;
(Continued)

(56) References Cited

U.S. PATENT DOCUMENTS

| 2013/0292599 A1 | 11/2013 | Robin |
| 2014/0305667 A1 | 10/2014 | Robin |

(Continued)

FOREIGN PATENT DOCUMENTS

| CN | 107406613 A | 11/2017 |
| CN | 110447066 A | 11/2019 |

(Continued)

OTHER PUBLICATIONS

Jul. 28, 2022, International Preliminary Report on Patentability issued in the International Patent Application No. PCT/JP2021/004337.

(Continued)

*Primary Examiner* — Hai Vo
(74) *Attorney, Agent, or Firm* — KENJA IP LAW PC

(57) ABSTRACT

Provided is a phenolic resin foam laminate board in which a flexible surface material is arranged on at least upper and lower surfaces of a phenolic resin foam. The phenolic resin foam contains HCFO-1224yd(Z), has a density of not less than 20 kg/m³ and not more than 55 kg/m³, a closed cell ratio of 80% or more, an average cell diameter of not less than 60 μm and not more than 200 μm, a percentage of an area seeping out from the surface material is 30% or less, and content of HCFO-1224yd(Z) per space volume of $22.4 \times 10^{-3}$ m³ in the phenolic resin foam is not less than 0.06 mol and not more than 0.35 mol.

16 Claims, 1 Drawing Sheet

(51) Int. Cl.
    *B32B 5/20*    (2006.01)
    *B32B 5/24*    (2006.01)
    *B32B 29/00*   (2006.01)
    *C08J 9/14*    (2006.01)

(58) Field of Classification Search
    CPC . B32B 2307/748; B32B 29/007; B32B 5/022;
         B32B 5/20; B32B 5/245; C08G 8/10;
         C08J 2203/14; C08J 2203/162; C08J
         2203/182; C08J 2203/202; C08J
         2205/052; C08J 2361/06; C08J 2361/10;
         C08J 9/141; C08J 9/146; C08J 9/149;
         C08L 61/06
    See application file for complete search history.

(56) References Cited

U.S. PATENT DOCUMENTS

| | | |
|---|---|---|
| 2016/0326331 A1 | 11/2016 | Hamajima et al. |
| 2017/0009037 A1 | 1/2017 | Hamajima et al. |
| 2018/0230283 A1 | 8/2018 | Ihara et al. |
| 2020/0055293 A1 | 2/2020 | Ogawa et al. |
| 2020/0230454 A1 | 7/2020 | Robin et al. |
| 2021/0230388 A1* | 7/2021 | Coppock ............... C08L 61/06 |
| 2023/0079015 A1* | 3/2023 | Butler .................. C08G 8/10 521/98 |
| 2023/0226801 A1* | 7/2023 | Hiramatsu ............ C08J 9/149 428/304.4 |

FOREIGN PATENT DOCUMENTS

| | | |
|---|---|---|
| CN | 111183200 A | 5/2020 |
| EP | 3275927 A1 | 1/2018 |
| EP | 3992220 A1 | 5/2022 |
| JP | 2008024868 A | 2/2008 |
| JP | 2014504675 A | 2/2014 |
| JP | 2014530939 A | 11/2014 |
| JP | 2015105343 A | 6/2015 |
| JP | 2015187249 A | 10/2015 |
| JP | 2016101750 A | 6/2016 |
| JP | 2018095869 A | 6/2018 |
| JP | 2019072922 A | 5/2019 |
| JP | 2019089292 A | 6/2019 |
| JP | 2021038313 A | 3/2021 |
| TW | 201641582 A | 12/2016 |
| WO | 2015111670 A1 | 7/2015 |
| WO | 2016152155 A1 | 9/2016 |
| WO | 2019036049 A1 | 2/2019 |
| WO | 2019101277 A1 | 5/2019 |
| WO | 2021002097 A1 | 1/2021 |

OTHER PUBLICATIONS

Apr. 13, 2021, International Search Report issued in the International Patent Application No. PCT/JP2021/004337.
Jun. 7, 2023, the Supplementary European Search Report issued by the European Patent Office in the corresponding European Patent Application No. 21750896.9.

* cited by examiner

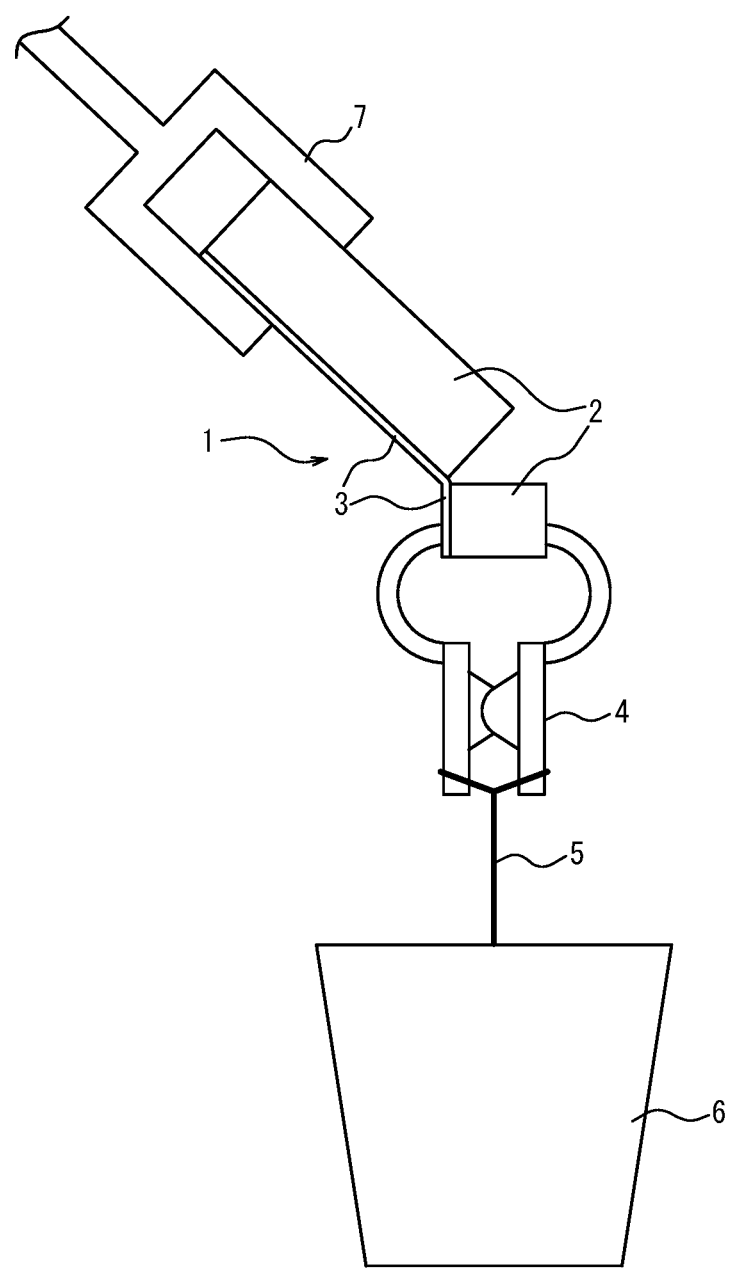

PHENOLIC RESIN FOAM LAMINATE BOARD

CROSS-REFERENCE TO RELATED APPLICATIONS

This application claims priority to Japanese Patent Application No. 2020-019158 filed in Japan on Feb. 6, 2020 and Japanese Patent Application No. 2020-089399 filed in Japan on May 22, 2020, the entire disclosure of which is incorporated herein by reference.

TECHNICAL FIELD

The present disclosure relates to a phenolic resin foam laminate board, and more particularly to a phenolic resin foam laminate board with less dirt seeping out of a surface material.

BACKGROUND

The acid-curable phenolic resin foam made from the resol-type phenolic resin is flame-resistant, emits less smoke, and has thermal insulation properties, so has been used, for example, for exterior wall materials such as metal siding, interior wall materials such as partition panels, as well as building materials such as ceiling materials, fire doors, and storm doors. The acid-curable phenolic resin foam is also widely used as cold and heat insulating materials for building materials and industrial plants.

As a blowing agent used for producing the phenolic resin foam, even higher thermal insulation is needed in terms of environmental issues and increasing demand for thermal insulation in buildings, and there is a need for technology to apply HCFO-1224yd(Z) (chemical name: (Z)-1-Chloro-2,3,3,3-Tetrafluoropropene), which has particularly low thermal conductivity as a blowing agent, to phenolic resin foam laminate boards.

As a technology that uses HCFO-1224yd(Z), the technologies disclosed in Patent Literatures (PTLs) 1 and 2 are known. PTL 1 discloses that a combination of HCFO-1224yd(Z) and the other blowing agent can be used for the phenolic resin foam.

Patent Literature (PTL) 2 discloses that the thermal conductivity can be reduced by using HCFO-1224yd(Z) in a urethane resin foam, which is the same thermosetting resin foam.

CITATION LIST

Patent Literature

PTL 1: WO2019036049 (A1)
PTL 2: JP2015105343 (A)

SUMMARY

Technical Problem

However, the phenolic resin foams disclosed in PTL 1 and PTL 2 cannot suppress diffusion from the foamable resin composition and viscosity reduction due to plasticization caused by characteristics of HCFO-1224yd(Z) at the same time. As a result, thermal insulation performance is reduced, and the foamable resin composition cannot be prevented from seeping out to the surface material.

The details thereof are described below. Since HCFO-1224yd(Z) has a low thermal conductivity among HCFOs, the component ratio of HCFO-1224yd(Z) in the blowing agent, in particular, the molar quantity of HCFO-1224yd(Z) filled in the phenolic resin foam affects the thermal insulation performance. In contrast, HCFO-1224yd(Z) has a low boiling point among HCFOs, thus it is likely that the foamable phenolic resin composition ejected onto the surface material dissipates before it cures, and that the molar quantity of HCFO-1224yd(Z) filled in the phenolic resin foam is decreased. As a result, it is difficult to make full use of low thermal conductivity of HCFO-1224yd(Z). Further, compared with the aliphatic hydrocarbon or the like, HCFO-1224yd(Z) has a higher solubility in the phenolic resin, and thus the viscosity of the foamable phenolic resin composition tends to decrease, and as a result, it tends to seep out from the surface material, and poor appearance of the surface of the phenolic resin foam laminate board tends to occur. In other words, it has been difficult to achieve both low thermal conductivity and prevention of seeping out to the surface material.

Therefore, a phenolic resin foam laminate board with a good appearance that suppresses seeping out from the surface material while reducing the thermal conductivity by using HCFO-1224yd(z) has been demanded.

Solution to Problem

Then, the inventors of the present disclosure have diligently studied to solve the above problem and have found a method of reducing seeping of the foamable phenolic resin composition out of the surface material along with filling a required amount in the phenolic resin composition while preventing HCFO-1224yd(Z), which is a blowing agent with a low boiling point, from being dissipated, when producing the phenolic resin foam laminate board, and solved the problem.

In other words, the present disclosure provides [1] to [5] described below.

[1] A phenolic resin foam laminate board in which a flexible surface material is arranged on at least one of one side of a phenolic resin foam and a back side of the one side, wherein: the phenolic resin foam contains HCFO-1224yd (Z); the phenolic resin foam has a density of not less than 20 $kg/m^3$ and not more than 55 $kg/m^3$, a closed cell ratio of not less than 80%, an average cell diameter of not less than 60 μm and not more than 200 μm, and a ratio of a seeping area from the surface material is 30% or less, and content of HCFO-1224yd(Z) per space volume of $22.4 \times 10^{-3}$ $m^3$ in the phenolic resin foam is not less than 0.06 mol and not more than 0.35 mol.

[2] The phenolic resin foam laminate board according to [1] comprising at least one gas component selected from aliphatic hydrocarbon having a carbon number of 6 or less and chlorinated saturated hydrocarbon having a carbon number of 5 or less.

[3] The phenolic resin foam laminate board according to [1] or [2], wherein the surface material is any of non-woven fabric, woven fabric and paper.

[4] The phenolic resin foam laminate board according to any one of [1]-[3], wherein a surface material peeling strength at 45° angle is 1,000 g or less.

[5] The phenolic resin foam laminate board according to any one of [1]-[4], wherein thermal conductivity under the environment of 23° C. is 0.0185 W/m·K or less.

Advantageous Effect

According to the present disclosure, a high performance phenolic resin foam laminate board having a high thermal insulation performance, less seeping of foamable phenolic resin composition out from the surface material, and a good appearance can be provided.

BRIEF DESCRIPTION OF THE DRAWINGS

In the accompanying drawing:
FIG. 1 is a diagram illustrating a method of measuring a surface material peeling strength at 45° angle.

DETAILED DESCRIPTION

The following provides a detailed description of the present disclosure according to a preferable embodiment thereof. Note that the present disclosure is not limited to the following embodiment, and can be modified in various manners and carried out within the scope thereof.

<Phenolic Resin Foam Laminate Board>

The phenolic resin foam laminate board according to this embodiment (hereinafter occasionally referred to as "foam laminate board") is a laminate comprising a phenolic resin foam in which a large number of bubbles are dispersed in a phenolic resin cured body formed by a curing reaction and a surface material at least on one side of the phenolic resin foam and a back side of the one side. Note that, since the foam laminate board of this embodiment has less seeping of foam phenolic resin composition out from the surface material, and the upper and lower surface materials can be peeled off, it can be used as a building material with excellent flame retardant and thermal insulation properties in a state of base material with the surface material peeled off. The "thickness direction" in this embodiment refers to the dimension of the shortest side of the three sides of the foam laminate board, and usually, the direction in which the foamable phenolic resin composition on the lower surface material foams and grows during production of the foam laminate board.

Further, the phenolic resin foam laminate board is used by alone or can be joined to an external member and used in various applications. Examples of external members include one or a combination of board materials and sheet/film materials. Examples of suitable board materials include wooden boards such as normal plywood, structural plywood, particle board, and OSB, wood-wool cement board, wood chip cement board, gypsum board, flexible board, medium density fiberboard, calcium silicate board, magnesium silicate board, and volcanic silicates fiber reinforced multi-layer board. Further, examples of suitable sheet/film materials include polyester non-woven fabric, polypropylene non-woven fabric, inorganic filled glass fiber non-woven fabric, glass fiber non-woven fabric, paper, calcium carbonate paper, polyethylene-treated paper, polyethylene film, plastic moisture-proof film, asphalt waterproof paper, and aluminum foil (with or without holes).

<Phenolic Resin Foam>

The density of the phenolic resin foam of the phenolic resin foam laminate board of this embodiment is not less than 20 kg/m$^3$ and not more than 55 kg/m$^3$, preferably not less than 22 kg/m$^3$ and not more than 50 kg/m$^3$, more preferably not less than 24 kg/m$^3$ and not more than 45 kg/m$^3$, even more preferably not less than 26 kg/m$^3$ and not more than 40 kg/m$^3$, and most preferably not less than 26 kg/m$^3$ and not more than 36 kg/m$^3$. When the density is 20 kg/m$^3$ or more, the mechanical strength such as compression strength and bending strength can be ensured and occurrence of damage during handling of foam can be avoided, whereas when the density is 55 kg/m$^3$ or less, heat transfer in the resin portion is less likely to increase, thus the thermal insulation performance can be kept. The density of the phenolic resin foam can be adjusted through adjustment of filling ratio of the blowing agent into the phenolic resin foam. The density can be adjusted mainly by changing the proportion of the blowing agent charged into the phenolic resin foam, the temperature of the foamable phenolic resin composition, the timing of pre-molding in a step of ejecting the mixed foamable phenolic resin composition onto a lower surface material, the ratio of the additive amount of the blowing agent and the additive amount of the organic acid used as acid curing agent, and curing conditions such as temperature and residence time.

The closed cell ratio of the phenolic resin foam of the phenolic resin foam laminate board is 80% or more, preferably 85% or more, more preferably 88% or more, even more preferably 90% or more, and most preferably 92% or more. When the closed cell ratio is 80% or more, long-term degradation of thermal insulation performance due to substitution of the blowing agent in phenolic resin foam with air can be suppressed. Note that the closed cell ratio of the phenolic resin foam can be adjusted to a desired value by changing, for example, the additive amount of foam nucleating agent, the ratio of the additive amount of blowing agent and the additive amount of organic acid used as acid curing agent, or the like.

The average cell diameter of the phenolic resin foam of the phenolic resin foam laminate board is not less than 60 μm and not more than 200 μm, preferably not less than 65 μm and not more than 180 μm, more preferably not less than 70 μm and not more than 155 μm, and most preferably not less than 75 μm and not more than 130 μm. When the average cell diameter is 60 μm or more, the density of the foam can be prevented from being high. As a result, the heat transfer ratio of the resin portion in the foam can be reduced, thus the thermal insulation performance of the phenolic resin foam can be ensured. In contrast, when the average cell diameter is 200 μm or less, an increase in the thermal conduction due to radiation is suppressed, and a high thermal insulation performance of the foam can be kept. The average cell diameter of the phenolic resin foam can be adjusted to a desired value through alternation of the additive amount of the solid foam nucleating agent, the temperature of the foamable phenolic resin composition, the timing of pre-molding in the step of ejecting the mixed foamable phenolic resin composition onto the lower surface material, the ratio of the additive amount of the blowing agent and the additive amount of the organic acid used as the acid curing agent, and the curing conditions such as the temperature, the residence time, or the like.

The thermal conductivity of the phenolic resin foam laminate board measured under the environment of 23° C. is preferably 0.0185 W/(mK) or less, more preferably 0.0182 W/(mK) or less, even more preferably 0.0178 W/(mK) or less, and particularly preferably 0.0174 W/(mK) or less, and most preferably 0.0170 W/(mK) or less.

Then, the phenolic resin foam of the phenolic resin foam laminate board contains HCFO-1224yd(Z), and is produced from foamable phenolic resin composition that contains phenolic resin, surfactant, blowing agent containing HCFO-1224yd(Z), solid foam nucleating agent and acid curing agent containing organic acid. Note that the foamable phenolic resin composition may optionally contain, in addition to the above-described components, phthalic acid-based compound, or the like.

As the phenolic resin, the resol-type phenolic resin obtained by synthesizing by the alkali metal hydroxide or the alkaline earth metal hydroxide is used. The resol-type phenolic resin is synthesized by heating phenols and aldehydes as materials with alkali catalyst in a temperature range of 40° C. to 100° C. Further, an additive such as urea may be added during synthesis or after synthesis of the resol-type phenolic resin, as necessary. In a case in which urea is added, it is preferable that urea that has been methylolated in advance using an alkali catalyst is mixed with the resol-type phenolic resin. Since the resol-type phenolic resin obtained after synthesis normally contains excess water, the resol-type phenolic resin is adjusted to obtain a suitable amount of water for foaming. Further, an aliphatic hydrocarbon, a high-boiling point alicyclic hydrocarbon, or a mixture thereof, diluents for viscosity adjustment such as ethylene glycol and diethylene glycol, as well as additives, as necessary, can be added to the phenolic resin.

The starting molar ratio of the phenols and the aldehydes when the phenolic resin is synthesized is preferably within a range from 1:1 to 1:4.5, and more preferably within a range from 1:1.5 to 1:2.5.

Examples of phenols that can preferably be used in synthesis of the phenolic resin in this embodiment include phenol itself and other phenols, and examples of other phenols include resorcinol, catechol, o-, m-, and p-cresol, xylenols, ethylphenols, p-tert-butylphenol, and the like. Further, binuclear phenols can also be used.

Further, the aldehydes may be any compound that can be an aldehyde source. As aldehydes, it is preferable to use formaldehyde itself, paraformaldehyde that can be depolymerized and used, and other aldehydes and derivatives thereof. Examples of other aldehydes include glyoxal, acetaldehyde, chloral, furfural, benzaldehyde, or the like. An additive such as urea, dicyandiamide, or melamine may be added, as an additive, to the phenolic resin. In this specification, when these additives are added, "phenolic resin" refers to the resin after additives are added thereto. Then, in this specification, the "phenolic resin composition" refers to those obtained by adding a surfactant to the "phenolic resin," and the "foamable phenolic resin composition" refers to those obtained by adding a blowing agent, a solid foam nucleating agent and an acid curing agent to the "phenolic resin composition" and then giving foaming and curing properties. Further, the resin portion after forming the phenolic resin foam is referred to as the "phenolic resin curing body."

The mass average molecular weight of the phenolic resin is preferably 900 or more, more preferably 1,000 or more, even more preferably 1,150 or more, and most preferably 1,300 or more. Further, the mass average molecular weight is preferably 2,500 or less, more preferably 2,200 or less, even more preferably 2,050 or less, and most preferably 1,900 or less. When the mass average molecular weight of the phenolic resin is 900 or more, temperature rise caused by internal heat generation of the foamable phenolic resin composition is suppressed, and diffusion of HCFO-1224yd(Z) component can be easily suppressed. In contrast, when the mass average molecular weight of the phenolic resin is 2,500 or less, seeping of the foamable phenolic resin composition can be easily suppressed. The mass average molecular weight of the phenolic resin can be measured by using the method described in Examples of this specification.

The viscosity of the phenolic resin and the phenolic resin composition at 40° C. is preferably not less than 5,000 mPa·s and not more than 100,000 mPa·s, more preferably not less than 7,000 mPa·s and not more than 50,000 mPa·s, and even more preferably not less than 9,000 mPa·s and not more than 40,000 mPa·s. Further, the amount of water of the phenolic resin and the phenolic resin composition is preferably not less than 1.5 mass % and not more than 30 mass %.

The surfactant, the blowing agent and the solid foam nucleating agent contained in the foamable phenolic resin composition may be added to the phenolic resin in advance or may be added simultaneously with the acid curing agent.

As a surfactant, those that are generally used for production of the phenolic resin foam can be used, and among them, a non-ionic surfactant is effective, and preferable examples thereof include, for example, an alkylene oxide that is a copolymer of ethylene oxide and propylene oxide, a condensate of an alkylene oxide and castor oil, a condensation product of an alkylene oxide and an alkylphenol such as nonylphenol or dodecylphenol, a polyoxyethylene alkyl ether in which the alkyl ether part has a carbon number of 14 to 22, a fatty acid ester such as a polyoxyethylene fatty acid ester, a silicone compound such as polydimethylsiloxane, and a polyalcohol. These surfactants may be used alone or as a combination of two or more types. The amount of use thereof is not limited, but is suitably used in the range of not less than 0.3 parts by mass and not more than 10 parts by mas per 100 parts by mass of phenolic resin.

The blowing agent contains HCFO-1224yd(Z) as a component. Further, it is preferable that the blowing agent contains at least one selected from the aliphatic hydrocarbon having a carbon number of 6 or less and the chlorinated saturated hydrocarbon having a carbon number of 5 or less, as a component of the blowing agent other than HCFO-1224yd(Z).

As the aliphatic hydrocarbon having a carbon number of 6 or less, those that are known as a blowing agent can be used. Examples thereof include, for example, isobutane, normal butane, cyclobutane, normal pentane, isopentane, cyclopentane, neopentane, or the like. These hydrocarbons may be used alone or a combination of two or more types.

Linear or branched chlorinated saturated hydrocarbons having a carbon number of 2 to 5 can be used as the chlorinated saturated hydrocarbon having a carbon number of 5 or less. The number of bonded chlorine atoms is not limited, but preferably 1 to 4. Examples of chlorinated aliphatic hydrocarbon include, for example, dichloroethane, propyl chloride, isopropyl chloride, butyl chloride, isobutyl chloride, pentyl chloride, isopentyl chloride, or the like. Of these, propyl chloride and isopropyl chloride, which are chloropropanes, are more preferably used.

Further, the blowing agent may include hydrofluoroolefins other than HCFO-1224yd(Z) (at least one of chlorinated hydrofluoroolefin and non-chlorinated hydrofluoroolefin).

Examples of chlorinated hydrofluoroolefins other than HCFO-1224yd(Z) include 1-chloro-3,3,3-trifluoropropene (HCFO-1233zd, for example, HCFO-1233zd (E), which is, Solstice® (Solstice is a registered trademark in Japan, other countries, or both) LBA (product name) from Honeywell Japan Ltd.), 1,1,2-trichloro 3,3,3-trifluoropropene (HCFO-1213xa), 1,2-dichloro 3,3,3-trifluoropropene (HCFO-1223xd), 1,1-dichloro-3,3,3-trifluoropropene (HCFO-1223za), 1-chloro 1,3,3,3-tetrafluoropropene (HCFO-1224zb), 2,3,3-trichloro-3-fluoropropene (HCFO-1231xf), 2,3-dichloro 3,3-difluoropropene (HCFO-1232xf), 2-chloro-1,1,3-trifluoropropene (HCFO-1233xc), 2-chloro-1,3,3-trifluoropropene (HCFO-1233xe), 2-chloro-3,3,3-trifluoropropene (HCFO-1233xf), 1-chloro-1,2,3-trifluoropropene (HCFO-1233yb), 3-chloro-1,1,3-trifluoropropene (HCFO-1233yc), 1-chloro-2,3,3-trifluoropropene (HCFO-1233yd), 3-chloro-1,2,3-trifluoropropene (HCFO-1233ye), 3-chloro 2,3,3-trifluoropropene (HCFO-1233yf), 1-chloro-1,3,3-trifluoropropene (HCFO-1233zb), 1-chloro-3,3,3-trifluoropropene (HCFO-1233zd), or the like, and configurational isomers thereof, that is, one of or mixture of E and Z is used. In addition, (E)-1-chloro-2,3,3,3-tetrafluoropropene (HCFO-1224yd (E)) is included.

Examples of non-chlorinated hydrofluoroolefins include 1,3,3,3-tetrafluoroprop-1-ene (HFO-1234ze, for example, HFO-1234ze (E), which is, product name: Solstice® (Solstice is a registered trademark in Japan, other countries, or both) from Honeywell Japan Ltd.), 1,1,1,4,4,4-hexafluoro-2-butene (HFO-1336mzz, for example, HFO-1336mzz (Z), which is, Opteon™ 1100 from Chemours Company), 2,3,3,3-tetrafluoro-1-propene (HFO-1234yf), 1,1,3,3,3-pentafluoropropene (HFO-1225zc), 1,3,3,3-tetrafluoropropene (HFO-1234ze), 3,3,3-trifluoropropene (HFO-1243zf), 1,1,1,4,4,5,5,5-octafluoro-2-pentene (HFO-1438mzz), or the like, and configurational isomers thereof, that is, one of or mixture of E and Z is used.

Furthermore, the other blowing agents are not particularly limited, and examples thereof include, for example, chemical blowing agent such as sodium hydrogen carbonate, sodium carbonate, calcium carbonate, magnesium carbonate, azodicarboxylic acid amide, azobisisobutyronitrile, barium azodicarboxylate, N,N'-dinitro sopentamethylenetramine, p, p'-oxybisbenzenesulfonylhydrazide, trihydrazinotriazine, or the like. These blowing agents may be used alone or as a combination of two or more types.

Although the amount of the blowing agent in the foamable phenolic resin composition differs depending on the type of blowing agent, compatibility with the phenolic resin, the temperature and foaming and curing conditions such as residence time, the amount of the blowing agent per 100 parts by mass, in total, of the phenolic resin and the surfactant is preferably not less than 4.0 parts by mass and not more than 11.0 parts by mass, more preferably not less than 4.5 parts by mass and not more than 10.5 parts by mass, and even more preferably not less than 5.0 parts by mass and not more than 10.0 parts by mass. When the amount of the blowing agent per 100 parts by mass, in total, of the phenolic resin and the surfactant is 4.0 parts by mass or more, an increase in the density of the phenolic resin foam can be suppressed. Further, when the amount of the blowing agent per 100 parts by mass, in total, of the phenolic resin and the surfactant is 11.0 parts by mass or less, the phenolic resin foam is prevented from being low density, then the phenolic resin foam can have a density having an appropriate strength. As a result, the cell wall surface is less likely to crack, and a decrease in the closed cell ratio can be easily suppressed.

The content of HCFO-1224yd(Z) per space volume $22.4 \times 10^{-3}$ $m^3$ in the phenolic resin foam in this embodiment is not less than 0.06 mol and not more than 0.35 mol, preferably not less than 0.11 mol and not more than 0.35 mol, more preferably not less than 0.15 mol and not more than 0.35 mol, even more preferably not less than 0.15 mol and not more than 0.30 mol, and most preferably not less than 0.15 mol and not more than 0.25 mol. When the amount of HCFO-1224yd(Z) is 0.06 mol or more, low thermal conductivity of phenolic resin foam and phenolic resin foam laminate board is achieved. Further, when the amount of HCFO-1224yd(Z) is 0.35 mol or less, a decrease in viscosity of the foamable phenolic resin composition along with plasticization of the resin due to high affinity with the phenolic resin is suppressed, and seeping of the foamable phenolic resin composition out from the surface material can be suppressed.

In this embodiment, the solid foam nucleating agent is preferably used as a foam nucleating agent for production of the phenolic resin foam. As the solid foam nucleating agent, inorganic powder such as aluminum hydroxide powder, aluminum oxide powder, calcium carbonate powder, talc, kaolin, silica stone powder, silica sand, mica, calcium silicate powder, wollastonite, glass powder, glass beads, fly ash, silica fume, gypsum powder, borax, slag powder, alumina cement, Portland cement, or the like, and organic powder such as pulverized powder of phenolic resin foam can be added. These foam nucleating agents may be used alone or as a combination of two or more types.

The solid foam nucleating agent only needs to be present in the foamable phenolic resin composition, and the timing of adding the agent is not particularly limited. In general, it is added to the phenolic resin composition, or is added simultaneously with the blowing agent in the mixing step described later.

The additive amount of the solid foam nucleating agent per 100 parts by mass of phenolic resin composition is preferably not less than 3.0 parts by mass and not more than 10.0 parts by mass, and more preferably not less than 4.0 parts by mass and not more than 8.0 parts by mass. When the additive amount of the solid foam nucleating agent is 3.0 parts by mass or more, it is less likely that the seeping of the foamable phenolic resin composition out from the surface material is suppressed. Further, when the additive amount of the solid foam nucleating agent is 10.0 parts by mass or less, diffusion of HCFO-1224yd(Z), which is a blowing agent with a low boiling point, can be easily suppressed.

The acidic curing agent may be required to be an acidic curing agent that can cure the phenolic resin composition, and includes organic acid as acid component. Examples of preferable organic acid include an aryl sulfonic acid or an anhydride thereof. Examples of aryl sulfonic acids and anhydrides thereof include toluene sulfonic acid, xylene sulfonic acid, phenol sulfonic acid, substituted phenol sulfonic acid, xylenol sulfonic acid, substituted xylenol sulfonic acid, dodecylbenzene sulfonic acid, benzene sulfonic acid, naphthalene sulfonic acid, and anhydrides of any of the preceding examples. One of these organic acids may be used, or a combination of two or more of these organic acids may be used. Note that, in this embodiment, resorcinol, cresol, saligenin (o-methylolphenol), p-methylolphenol, or the like, may be added as a curing aid. Moreover, these curing agents may be diluted with a solvent such as ethylene glycol or diethylene glycol.

The amount of the acid curing agent that is used differs depending on the type of the acid curing agent, and when a mixture of 60 mass % of paratoluene sulfonic acid monohydrate and 40 mass % of diethylene glycol is used, preferably not less than 8 parts by mass and not more than 20 parts by mass, and more preferably not less than 10 parts by mass and not more than 15 parts by mass of the acid curing agent is used per 100 parts by mass, in total, of phenolic resin and surfactant.

The surface materials provided on at least one of one side or the back side of the one side of the phenolic resin foam may be surface materials that have flexibility (flexible surface materials). Preferable examples of flexible surface materials that can be used include non-woven fabric and woven fabric containing polyester, polypropylene, nylon, or the like, as a main component, paper such as kraft paper, glass fiber mixed paper, calcium hydroxide paper, aluminum hydroxide paper, or magnesium silicate paper, and non-woven fabric of inorganic fiber such as glass fiber non-woven fabric. They may be mixed (or laminated). In a case in which the surface materials are to be peeled from the resultant phenolic resin foam laminate board so as to use only the base material, it is preferable to use a cheap paper that can be disposed of after peeling. Such surface materials are typically provided in the form of a roll. Moreover, as the flexible surface materials, those kneaded with additives such as flame retardants may be used. Note that the surface material and the phenolic resin foam may be bonded in various manners, and adhesives such as epoxy resin may be used. However, they are bonded preferably by only adhesion force when the phenolic resin foam is thermally cured on the surface material, in terms of production cost and prevention of complication of the production process.

Percentage of seeping out from the surface material can be evaluated by the measurement method described later, and it is 30% or less, preferably 25% or less, more preferably 20% or less, even more preferably 15% or less, and most preferably 10% or less. When it is 30% or less, a phenolic resin foam laminate board with good appearance can be obtained, and the surface material peeling strength at 45° angle is decreased. As a result, the surface material is peeled off, and it can be used as a phenolic resin foam.

The surface material peeling strength of the phenolic resin foam laminate board of this embodiment at 45° angle is preferably 1,000 g or less, more preferably 900 g or less, even more preferably 800 g or less, and most preferably 700 g or less. When the surface material peeling strength of phenolic resin foam laminate board at 45° angle is 1,000 g or less, the surface material is easily peeled off, and it is easily used without the surface material. Here, the surface material peeling strength at 45° angle can be adjusted to a desired value by changing the additive amount of HCFO-1224yd(Z), use amount and additive amount of the solid foam nucleating agent, the mass average molecular weight of the phenolic resin, and the temperature of the foamable phenolic resin composition. Note that the surface material peeling strength of the phenolic resin foam laminate board at 45° angle can be measured by the method described in Examples of this specification.

<Production Method of Phenolic Resin Foam Laminate Board>

Next, the production method of the phenolic resin foam laminate board described above will be explained.

As the production method of the phenolic resin foam laminate board, a continuous production process that includes: a step of mixing the foamable phenolic resin composition described above with a mixer; a step of ejecting the foamable phenolic resin composition that has been mixed onto a lower surface material; and a step of producing a phenolic resin foam laminate board from the phenolic resin composition that had been ejected onto the lower surface material can be adopted.

In the continuous production process, the phenolic resin composition ejected onto the lower surface material is covered with the upper surface material, then is pre-molded such that it is leveled from above and below while being foamed and cured, and is fully molded in a board shape while proceeding with foaming and curing.

In the continuous production process, examples of a method of carrying out pre-molding and main-molding include various methods depending on the production purpose such as a method of using a slat-type double conveyor, a method of using a metal roll or a steel plate, or a method of using a combination thereof. When molding is carried out using a slat-type double conveyor, for example, a foamable phenolic resin composition covered with the upper and lower surface materials is continuously guided into the slat-type double conveyor, then is applied with a pressure in the vertical direction while being heated so as to be adjusted to a predetermined thickness, and is foamed, cured, and is molded into a board shape.

The temperature of the foamable phenolic resin composition when it is ejected onto the lower surface material is preferably not lower than 35° C. and not higher than 45° C. When the temperature of the foamable phenolic resin composition is 35° C. or higher, the foamable phenolic resin composition tends to foam in the early stage, and as a result, seeping of the foamable phenolic resin composition out from the lower surface material can be easily suppressed. In contrast, when the temperature of the foamable phenolic resin composition is 45° C. or lower, diffusion of HCFO-1224yd(Z), which is a blowing agent with a low boiling point, can be easily suppressed. Note that, the temperature of the foamable phenolic resin composition ejected onto the lower surface material can be changed by adjusting the temperature or flow rate of the temperature control water of the mixing head for mixing various compositions, number of rotations, or the like.

The step of carrying out a pre-molding of the foamable phenolic resin composition, which is ejected onto the lower surface material, from above the upper surface material while being foamed and cured is preferably carried out in a range of not lower than 40° C. and not higher than 80° C. When the temperature is 40° C. or higher, foaming promotion effect in the pre-molding step can be easily obtained, and curing can be promoted. Further, when the temperature is 80° C. or lower, it is less likely to be influenced by the internal heat generation near the center in the thickness direction. Thus, it is less likely that the central temperature rises easily, and a decrease in the closed cell ratio can be suppressed.

In order to efficiently promote curing while suppressing a decrease in the closed cell ratio due to internal heat generation near the center in the thickness direction when foaming and curing the foamable phenolic resin composition, it is important to provide a main-molding step and a post-curing step after the pre-molding step to increase the temperature in stages. The heating temperature control conditions of the main-molding step after the pre-molding step is preferably not lower than 65° C. and not higher than 100° C. In this section, the main molding can be performed using an endless steel belt-type double conveyor, a slat-type double conveyor, a roll, or the like. Further, the residence time of the main-molding step is preferably not shorter than 5 min. and not longer than 2 hours because it is a main step in which foaming and curing reactions are performed. When the residence time is 5 min. or more, foaming and curing can be sufficiently proceeded. When the residence time is within 2 hours, production efficiency of the phenolic resin foam laminate board can be increased. Note that, when a conveyor is used, the difference in temperature between the upper and the lower conveyors is preferably less than 4° C.

The post-curing step is applied after the temperature is controlled by heating after the temperature control section of the pre-molding step and the main-molding step. The temperature of the post-curing step is preferably not lower than 90° C. and not higher than 120° C. When the temperature is 90° C. or more, the water in the foam board is easy to disperse, and when the temperature is 120° C. or less, a decrease in the closed cell ratio of the product is suppressed, and a high thermal insulation performance can be expressed. When the temperature control section is provided in the post-curing step, water in the foamable phenolic resin composition can be dispersed after a final molding,

EXAMPLES

Although the following provides a more detailed description of the present disclosure through examples and comparative examples, the present disclosure is not limited thereto.

<Synthesis of Phenolic Resin A>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. by a temperature controller. Next, the temperature was increased while adding 48 mass % sodium hydroxide aqueous solution to carry out a reaction. At the stage at which the Ostwald viscosity of the reaction liquid reached 110 centistokes (=110×10$^{-6}$ m$^2$/s; measurement value at 25° C.), the reaction liquid was cooled, and 398 kg of urea was added. Thereafter, the reaction liquid was cooled to 30° C., and a 50 mass % aqueous solution of paratoluene sulfonic acid monohydrate was added until the pH reached 6.4.

The resultant reaction liquid was then concentrated at 60° C. to yield a phenolic resin A. The mass average molecular weight and the viscosity at 40° C. of phenolic resin A were measured using the following methods, and the mass average molecular weight was 1,300, and the viscosity at 40° C. was 9,700 mPa·s.

<Viscosity>

The measurement value obtained using a rotary viscometer (R-100 from Toki Sangyo Co., Ltd.; rotor part: 3°×R-14) after 3 minutes of stabilization at 40° C. was defined as the viscosity of the phenolic resin A.

<Mass Average Molecular Weight>

Gel permeation chromatography (GPC) measurement was performed under the following conditions, and the mass average molecular weight Mw of the phenolic resin was obtained from the calibration curve obtained with the standard substance (standard polystyrene, 2-hydroxybenzyl alcohol and phenol) shown below.

Preprocessing:

About 10 mg of phenolic resin was dissolved in 1 ml of N, N dimethylfolmamide (from Wako Pure Chemical Industries, Ltd., for high performance liquid chromatograph), and the solution filtered through a 0.2 μm membrane filter was used as the measurement solution.

Measurement Conditions:

Measurement device: Shodex System 21 (Showa Denko K. K)

Column: Shodex asahipak GF-310HQ (7.5 mm I.D.×30 cm)

Eluent: 0.1 mass % of lithium bromide was dissolved in N, N dimethylformamide (from Wako Pure Chemical Industries, Ltd., for high performance liquid chromatograph) and used.

Flow rate: 0.6 ml/min.

Detector: RI detector

Column temperature: 40° C.

Standard substance: Standard polystyrene ("Shodex standard SL-105" from Showa Denko K. K), 2-Hydroxybenzyl alcohol (Sigma-Aldrich Co. LLC, 99%), Phenol (Kanto Chemical Co., Inc., Special)

<Synthesis of Phenolic Resin B>

The phenolic resin B with a mass average molecular weight of 900 and a viscosity at 40° C. of 9,800 mPa·s was obtained by synthesizing in the same procedure as in the phenolic resin A, except that, at the stage at which the Ostwald viscosity of the reaction liquid reached 80 centistokes (=80×10$^{-6}$ m$^2$/s; measurement value at 25° C.), the reaction liquid was cooled and 430 kg of urea was added, and by adjusting the concentration conditions of the reaction liquid.

<Synthesis of Phenolic Resin C>

The phenolic resin C with a mass average molecular weight of 2,500 and a viscosity at 40° C. of 9,300 mPa·s was obtained by synthesizing in the same procedure as in the phenolic resin A, except that, at the stage at which the Ostwald viscosity of the reaction liquid reached 240 centistokes (=160×10$^{-6}$ m$^2$/s; measurement value at 25° C.), the reaction liquid was cooled and 310 kg of urea was added, and by adjusting the concentration conditions of the reaction liquid.

<Synthesis of Phenolic Resin D>

The phenolic resin D with a mass average molecular weight of 800 and a viscosity at 40° C. of 9,500 mPa·s was obtained by synthesizing in the same procedure as in the phenolic resin A, except that, at the stage at which the Ostwald viscosity of the reaction liquid reached 75 centistokes (=75×10$^{-6}$ m$^2$/s; measurement value at 25° C.), the reaction liquid was cooled and 450 kg of urea was added, and by adjusting the concentration conditions of the reaction liquid.

<Production Method of Phenolic Resin Foam Laminate Board>

Example 1

A composition containing an ethylene oxide-propylene oxide block copolymer and polyoxyethylene dodecyl phenyl ether in a mass ratio of 50% each was mixed as a surfactant in a proportion of 3.0 parts by mass per 100 parts by mass of the phenolic resin A, which was provided as a phenolic resin composition. Then, 4.0 parts by mass of phenolic resin foam, as a solid foam nucleating agent, to the phenolic resin composition, 7.2 parts by mass of a mixture of 40 mass % of HCFO-1224yd(Z) and 60 mass % of cyclopentane as a blowing agent, and 12.0 parts by mass of composition of a mixture of 80 mass % of xylene sulfonic acid and 20 mass % of diethylene glycol as an acidic curing agent were added per 100 parts by mass of the phenolic resin composition containing the above-described surfactant, and these materials were then fed to a variable rotation speed mixing head that was temperature controlled to 18° C. The phenolic resin foam powder used here was the phenolic resin foam (Neoma Foam from Asahi Kasei Construction Materials Co.) pulverized powder (the average particle size: 28.0 μm, the bulk density: 181 kg/m$^3$) pulverized in the same procedure as in Example 1 disclosed in JP2008-024868(A), and kneading thereof was performed by a twin screw extruder before adding the blowing agent and the acid curing agent. Thereafter, the blowing agent and the acid curing agent were mixed, and a foamable phenolic resin composition obtained was distributed in a multiport distribution pipe and was fed onto a moving lower surface material. Note that a mixer disclosed in JP H10-225993(A) was used as the mixing device (mixer). In other words, the mixer included feeding ports for the phenolic resin composition including the solid foam nucleating agent and for the blowing agent in an upper side surface of the mixer and included a feeding port for the acidic curing agent in a side surface in proximity to the center of a stirring part where a rotor stirs. Downstream of the stirring part was connected to nozzles for ejection of the foamable phenolic resin composition. In other words, the mixer comprised a part up to the acidic curing agent feeding port as a mixing part (preceding stage), a part from the acidic curing agent feeding port up to a part where stirring ends as a mixing part (subsequent stage), and a part from the part where stirring ends up to the nozzles as a distribution part. The distribution part included a plurality of nozzles at the end thereof and was designed such that the foamable phenolic resin composition that had been mixed was uniformly distributed. Moreover, the distribution part has a jacket structure that allows sufficient heat exchange with temperature-controlled water, and the temperature of the temperature-controlled water of the distribution part was set to 23° C. Further, a thermocouple was installed at an ejection port of the multiport distribution pipe to enable detection of the temperature of the foamable phenolic resin composition, and the rotation speed of the mixing head was set as 300 rpm. The foamable phenolic resin composition that was ejected onto the lower surface material had a temperature of 39° C. The foamable phenolic resin composition fed onto the lower surface material was introduced to the pre-molding step whose temperature was controlled to 65° C., and after 30 sec., pre-molding was performed from above the upper surface material by a free roller. The pre-molding was adjusted by setting the roll to a height that was ⅔ of the floss height at the time of ejection. Then, the foamable phenolic resin composition was fed into a slat-type double conveyor heated to 83° C. with the foamable phenolic resin composition sandwiched between two surface materials (main-molding step), curing was performed with a residence time of 15 minutes, and then a further 2 hours of curing was performed in a 110° C. oven (post-curing step) to obtain a phenolic resin foam laminate board with a thickness of 50 mm. Note that, as the surface material, polyester non-woven fabric (Asahi Kasei ELTAS E05060 having a basis weight of 60 g/m$^2$) was used for both the upper and lower surface materials.

Then, the characteristics (the density, the closed cell ratio, and the average cell diameter of the phenolic resin foam, the content of HCFO-1224yd(Z) per space volume 22.4×10$^{-3}$ m$^3$ in the phenolic resin foam, percentage of the area of seeping from the surface material, surface material peeling strength at 45° angle, and the thermal conductivity under environment of 23° C.) of the obtained phenolic resin foam and the phenolic resin foam laminate board were evaluated by the following methods.

<Density of Phenolic Resin Foam>

A 200 mm square of the phenolic resin foam board was taken as a sample and the surface material was removed from the sample, then the mass and apparent volume thereof were measured in accordance with JIS K7222.

<Closed Cell Ratio of Phenolic Resin Foam>

The closed cell ratio of phenolic resin foam was measured in accordance with ASTM-D-2856 (method C). Specifically, after the surface materials had been removed from the phenolic resin foam laminate board, a cork borer was used to hollow out a cylindrical sample of 35 mm to 36 mm in diameter. The sample was cut and aligned to a height of 30 mm to 40 mm, and then the sample volume was measured by a standard usage method of an air comparison pycnometer (1,000 type from Tokyo Science Co., Ltd.). The volume of walls (parts other than cells and voids) calculated from the sample mass and the density of the phenolic resin curing body was subtracted from the sample volume. The resultant value was then divided by the apparent volume of the sample calculated from the external dimensions thereof, which was determined to be the closed cell ratio. Note that the density of the phenolic resin curing body was taken to be 1.3 kg/L.

<Average Cell Diameter of Phenolic Resin Foam>

The average cell diameter of the phenolic resin foam was measured with reference to the method described in JIS K6402. A photograph was taken at ×50 magnification with respect to a cross-section of a test specimen obtained by cutting parallel to front and rear surfaces of the phenolic resin foam laminate board at the approximate thickness direction center thereof. Four straight lines of 90 mm in length (equivalent to 1,800 μm in the actual foam cross-section) were drawn in the obtained photograph in a manner that avoided voids, the number of cells measured in accordance with the number of cells crossed by each of the straight lines was determined for each of the straight lines, and a value obtained by dividing the average value of the number of cells by 1,800 μm was taken to be the average cell diameter.

<Percentage of Area Seeped from Surface Material>

After marking the area where the foamable phenolic resin composition seeped out on the upper and lower surface materials of the phenolic resin foam laminate board with a pen, a 300 mm×300 mm area of the phenolic resin foam laminate board was photographed with a digital camera. After color tone correction, the number of pixels at the location where the resin composition seeped out and that of 300 mm×300 mm area were counted, respectively, by a pixel counter software, and the percentage of the area seeped out was calculated using the following equation (1).

$$\text{Percentage of area seeped from surface material (\%)} = (\text{The number of pixels in the enclosed area}/\text{the number of pixels in the entire area of 300 mm} \times 300 \text{ mm}) \times 100 \quad (1)$$

<Surface Material Peel Strength at 45° Angle>

The surface material peel strength of the phenolic resin foam laminate board at 45° angle was calculated by measuring as described below (see FIG. 1). First, the phenolic resin foam laminate board was cut into 50 mm width and 120 mm length (the length direction coincides with the product flow direction), and one of the surface materials (a) and (b) located on the upper and lower surfaces, (b), was peeled off. Then, the phenolic resin foam laminate board after peeling off of the surface material (b) was cut in the direction parallel to the upper and lower surfaces, and as a result, a sample for evaluation 1 having a width of 50 mm, a length of 120 mm and a thickness of 25 mm with a surface material (a) was prepared. Next, at a position of 20 mm from one end of the evaluation sample 1 in the length direction, a notch having a depth of 20 mm was made in the thickness direction from the side having no surface material (a), using a cutter. At the notch position, the base material 2 of the sample for evaluation was carefully divided in the thickness direction. At this time, care was taken so that no force in the length direction was applied to prevent the surface material (a) (corresponding to the surface material 3 in FIG. 1) from being peeled off from the base material 2. Then, the longer portion of the sample 1 for evaluation, in which the base metal was divided, was held by the clamp 7 at an angle of 45° to the horizontal plane, as illustrated in FIG. 1. Further, the container 6 connected by the metal wire 5 was set at the end of the portion on the side where the base material was shorter via the paper clip 4. Thereafter, water was continuously fed into the empty container 6 using a pump (not illustrated) at a rate of 100 g/min. The mass of water in the container 6 when the surface material 3 was peeled off from the notch position by 50 mm in the length direction of the evaluation sample 1 was measured. The same operation was performed twice, and the average value of the total mass of the paper clip 4, the metal wire 5, the container 6, and the obtained water was taken as the surface material peeling strength (a). Further, a sample for evaluation having a surface material (b), a width of 50 mm, a length of 120 mm, and a thickness of 25 mm was prepared separately, and the surface material peeling strength (b) was obtained in the same manner as the surface material peeling strength (a). Then, the lower value of the surface material peeling strength (a) and the surface material peeling strength (b) was taken as the surface material peeling strength (unit: g) of the phenolic resin foam laminate board at 45° angle.

<Water Content in Solid>

The moisture vaporized by heating at 110° C. was measured with a Karl Fischer moisture meter equipped with a boat-type moisture vaporizer.

<Composition Ratio of HCFO-1224yd(Z) and Other Blowing Gas Contained in Foam>

Ten grams of the foam sample with the surface material peeled off and a metal file were placed in a 10 L container (product name: Tedlar bag), sealed, and injected with 5 L of nitrogen. The sample was scraped from the top of the Tedlar bag using a file and finely crushed. Then, the sample was placed in a temperature controller whose temperature was adjusted to 81° C. for 10 minutes. 100 μL of the gas generated in the Tedlar bag was sampled, measured with GC/MS, and the type and composition ratio of the generated gas component were analyzed. The type of blowing gas was identified from the retention time and mass spectrum. Separately, the detection sensitivity of the generated gas component was measured, and the composition ratio was calculated from the area of the detection area of each gas component obtained by the GC/MS and the detection sensitivity.

(GC/MS Conditions)

GC/MS measurement was set as shown below and performed.

Gas chromatography: "Agilent 7890" from Agilent Technology Inc.
Column: DB-5MS (0.25 mmφ×30 m, Film thickness 1 μm)
Carrier gas: Helium
Flow rate: 1 ml/min.
Inlet temperature: 150° C.
Injection method: Split method (1/10)
Injection amount of sample: Solution 1 μL (for a gas sample, 100 μl is injected using a gas tight syringe)
Column temperature: After 40° C. (5 min.), temperature was increased up to 150° C. at 50° C./min, and was kept for 4.8 min.
Mass analysis: "Q1000GC" from JEOL Ltd.
Ionization method: Electron ionization (70 eV)
Scan range: m/Z=10 to 500
Voltage: −1300V
Ion source temperature: 230° C.
Interface temperature: 150° C.

<Content of HCFO-1224yd(Z) in Phenolic Resin Foam>

The phenolic resin foam laminate board sample was cut into approximately 100 mm squares, and six specimens were prepared. Then, six sealable, heat-resistant bags with zippers (hereinafter referred to as "zipper bags") were prepared, and the mass of each bag was measured using a precision balance. The specimens were placed in a circulating oven whose temperature was controlled at 70° C. for 24±0.5 hours to dissipate the water contained therein. The specimens were then immediately placed in zipper bags, sealed, and cooled to room temperature. After cooling to the room temperature, each specimen was taken out of the zipper bag. Then, the surface material of each specimen was immediately peeled, the mass (W1) of each specimen was measured with a precision balance, and the length of each side was measured by calipers to calculate the volume (V) of the specimen. Then, each specimen was returned to the zipper bag, placed between boards of a hydraulic press at room temperature with some openings left, and gradually compressed to a pressure of approximately 200N/cm² by the hydraulic press to destroy cells in the specimen. For three of the six specimens, a part of the specimen was taken, the amount of moisture contained was measured using the above-described method of measuring the amount of moisture in the solid, and the amount of moisture (WS1) averaged over three points were determined. For the remainder of the three specimens that were partially sampled for measuring the amount of moisture described above, and for the other three specimens, they were remained in the zipper bag with some openings left and placed in a circulating oven whose temperature was controlled at 81° C. for 30±5 min. Immediately thereafter, the gas in the bag was discharged while preventing the powder from coming out of the bag, the bag was sealed, and cooled to the room temperature. After cooling to the room temperature, the mass of the zipper bag containing a specimen that had not been sampled for measuring the moisture content was measured with a precision balance, a mass of the zipper bag was subtracted therefrom, and the mass (W2) with volatile components removed was measured at three points. At the same time, a part of the samples was taken from the three specimen bags from which specimens were taken for water content measurement, the moisture content was measured in the same manner, and the average water content (WS2) of three points was determined. In other words, the amount of moisture in measurement of each of W1 and W2 in this test corresponds to WS1 and WS2 in the equation (2) shown below.

For the masses of HCFO-1224yd(Z) and the other foaming gas in the foam, the volatile component mass (W3) was measured by subtracting the difference between WS1 and WS2 from the above described difference between W1 and W2, and adding the air buoyancy mass (WF). The air buoyancy mass (WF) was calculated by subtracting the resin volume calculated from W2 from the volume (V) of the specimen (the space volume in the foam), and by using the air density (0.00119 g/mL), wherein the density of the solid phenolic resin is defined as 1.3 g/cm³, which is a generally known density of phenolic resin. The obtained W3 was multiplied by the measured ratio of HCFO-1224yd(Z) and other foaming gas components to calculate the mass (W4) of HCFO-1224yd(Z). W3 and WF are expressed by the following equations, respectively.

$$W3=(W1-W2)-(WS1-WS2)+WF \qquad (2)$$

$$WF=(V-W2/1.3)\times 0.00119 \qquad (3)$$

The content (mol/22.4×10⁻³ m³) of HCFO-1224yd(Z) in the foam was calculated by using the molecular weight of HCFO-1224yd(Z).

<Thermal Conductivity Under Environment of 23° C.>

The thermal conductivity of the phenolic resin foam laminate board in the thickness direction was measured under environment of 23° C. by the following method in accordance with JIS A 1412-2:1999. Specific procedures are shown below.

A 300 mm square was cut out from the phenolic resin foam laminate board, a specimen was placed in an atmosphere of the temperature of 23±1° C. and the humidity of 50±2%, and the change in weight over time was measured every 24 hours. The state was confirmed and adjusted until 0.2 mass % or less of the change in the weight after 24 hours was obtained. The state adjusted foam laminate board specimen was introduced to a thermal conductivity apparatus placed in the atmosphere of the temperature of 23±1° C. and the humidity of 50±2%. When the thermal conductivity apparatus was not placed in the room which was controlled to the temperature of 23±1° C. and the humidity of 50±2%, in which the foam laminate board had been placed, the specimen whose state had been confirmed and adjusted in the above-described atmosphere was immediately placed in a polyethylene bag. Then the bag was closed, and the specimen was taken out of the bag within one hour and the thermal conductivity thereof was measured immediately.

The thermal conductivity was measured using a single test specimen and a measurement apparatus (EKO Instruments Co., Ltd.; product name: HC-074/FOX304) in which, symmetrical configuration method was adopted. The thermal conductivity in a 23° C. environment was measured under conditions of a low-temperature plate of 13° C. and high-temperature plate of 33° C.

Example 2

The phenolic resin foam laminate board was obtained in the same manner as in Example 1, except that the temperature of the temperature-controlled water of the mixer distribution part was set to 16° C.

Example 3

The phenolic resin foam laminate board was obtained in the same manner as in Example 1, except that the temperature of the temperature-controlled water of the mixer distribution part was set to 28° C.

Example 4

The phenolic resin foam laminate board was obtained in the same manner as in Example 1, except that the phenolic resin B was used for the phenolic resin A.

Example 5

The phenolic resin foam laminate board was obtained in the same manner as in Example 1, except that the phenolic resin C was used for the phenolic resin A.

Example 6

The phenolic resin foam laminate board was obtained in the same manner as in Example 1, except that 7.6 parts by mass of a mixture of 65 mass % of HCFO-1224yd(Z) and 35 mass % of cyclopentane was added as a blowing agent and 13.0 parts by mass of a composition consisting of a mixture of 80 mass % of xylene sulfonic acid and 20 mass % of diethylene glycol was added as an acid curing agent.

Example 7

The phenolic resin foam laminate board was obtained in the same manner as in Example 1, except that 7.7 parts by mass of a mixture of 40 mass % of HCFO-1224yd(Z) and 60 mass % of isopentane was added as a blowing agent and 13.2 parts by mass of a composition consisting of a mixture of 80 mass % of xylene sulfonic acid and 20 mass % of diethylene glycol was added as an acid curing agent.

Example 8

The phenolic resin foam laminate board was obtained in the same manner as in Example 1, except that 8.3 parts by mass of a mixture of 40 mass % of HCFO-1224yd(Z) and 60 mass % of 2-chloropropane was added as a blowing agent and 13.3 parts by mass of a composition consisting of a mixture of 80 mass % of xylene sulfonic acid and 20 mass % of diethylene glycol was added as an acid curing agent.

Example 9

The phenolic resin foam laminate board was obtained in the same manner as in Example 1, except that 9.7 parts by mass of a mixture of 40 mass % of HCFO-1224yd(Z), 35 mass % of HCFO-1233zd(E) and 25 mass % of cyclopentane was added as a blowing agent and 13.5 parts by mass of a composition consisting of a mixture of 80 mass % of xylene sulfonic acid and 20 mass % of diethylene glycol was added as an acid curing agent.

Example 10

The phenolic resin foam laminate board was obtained in the same manner as in Example 1, except that 9.7 parts by mass of a mixture of 40 mass % of HCFO-1224yd(Z), 35 mass % of HCFO-1233zd(E) and 25 mass % of isopentane was added as a blowing agent and 13.6 parts by mass of a composition consisting of a mixture of 80 mass % of xylene sulfonic acid and 20 mass % of diethylene glycol was added as an acid curing agent.

Example 11

The phenolic resin foam laminate board was obtained in the same manner as in Example 1, except that 3.0 mass % of aluminum hydroxide powder (B-325 from TOMOE Engineering Co., Ltd., average particle size: 23.0 μm) was added as a solid foam nucleating agent to the phenolic resin composition.

Example 12

The phenolic resin foam laminate board was obtained in the same manner as in Example 1, except that 7.9 parts by mass of a mixture of 85 mass % of HCFO-1224yd(Z) and 15 mass % of cyclopentane was added as a blowing agent and 13.2 parts by mass of a composition consisting of a mixture of 80 mass % of xylene sulfonic acid and 20 mass % of diethylene glycol was added as an acid curing agent.

Comparative Example 1

The phenolic resin foam laminate board was obtained in the same manner as in Example 1, except that the phenolic resin D was used for the phenolic resin A.

Comparative Example 2

The phenolic resin foam laminate board was obtained in the same manner as in Example 1, except that a solid foam nucleating agent was not used as a foam nucleating agent, and nitrogen, which was a gas foam nucleating agent, was added so as to be 1 mass % with respect to 100 parts by mass of blowing agent.

Comparative Example 3

The phenolic resin foam laminate board was obtained in the same manner as in Example 1, except that the temperature of the temperature-controlled water of the mixer distribution part was set at 14° C.

Comparative Example 4

The phenolic resin foam laminate board was obtained in the same manner as in Example 1, except that the temperature of the temperature-controlled water of the mixer distribution part was set at 30° C.

Table 1 shows the production conditions specific to Examples 1-12 and Comparative Examples 1-4 and the characteristic evaluation results of the resultant phenolic resin foam laminate boards.

TABLE 1

| | Phenolic resin | Blowing agent | Ratio of HCFO1224 yd to be added (wt %) | Foam nucleating agent | Temperature of foamable phenolic resin composition ejected onto the lower surface material (° C.) | Density (kg/m³) | Closed cell ratio (%) | Average cell diameter (µm) | Percentage of area seeped from surface material (%) | Content of HCFO-1224 yd(Z) per space volume of 22.4 × $10^{-3}$ m³ in phenolic resin foam (mol) | Surface material peeling strength at 45° angle (g) | Thermal conductivity under environment of 23° C. (W/m · K) |
|---|---|---|---|---|---|---|---|---|---|---|---|---|
| Example 1 | A | HCFO1224 yd/ cyclopentane | 40 | Phenolic resin foam powder | 39 | 31 | 93 | 95 | 4 | 0.11 | 687 | 0.0177 |
| Example 2 | A | HCFO1224 yd/ cyclopentane | 40 | Phenolic resin foam powder | 35 | 29 | 94 | 90 | 29 | 0.35 | 992 | 0.0164 |
| Example 3 | A | HCFO1224 yd/ cyclopentane | 40 | Phenolic resin foam powder | 45 | 33 | 90 | 115 | 0 | 0.07 | 589 | 0.0185 |
| Example 4 | B | HCFO1224 yd/ cyclopentane | 40 | Phenolic resin foam powder | 44 | 32 | 91 | 107 | 0 | 0.07 | 612 | 0.0185 |
| Example 5 | C | HCFO1224 yd/ cyclopentane | 40 | Phenolic resin foam powder | 37 | 29 | 92 | 102 | 29 | 0.18 | 989 | 0.0174 |
| Example 6 | A | HCFO1224 yd/ cyclopentane | 65 | Phenolic resin foam powder | 36 | 29 | 94 | 89 | 26 | 0.17 | 936 | 0.0172 |
| Example 7 | A | HCFO1224 yd/ isopentane | 40 | Phenolic resin foam powder | 37 | 32 | 92 | 104 | 4 | 0.11 | 650 | 0.0180 |
| Example 8 | A | HCFO1224 yd/ 2-chloropropane | 40 | Phenolic resin foam powder | 39 | 31 | 93 | 109 | 15 | 0.15 | 828 | 0.0176 |
| Example 9 | A | HCFO1224 yd/ HFO1233zd/ cyclopentane | 40 | Phenolic resin foam powder | 39 | 31 | 94 | 95 | 28 | 0.20 | 989 | 0.0168 |
| Example 10 | A | HCFO1224 yd/ HFO1233zd/ isopentane | 40 | Phenolic resin foam powder | 39 | 31 | 93 | 98 | 13 | 0.20 | 807 | 0.0171 |
| Example 11 | A | HCFO1224 yd/ cyclopentane | 40 | Aluminum hydroxide powder | 38 | 31 | 92 | 96 | 6 | 0.11 | 662 | 0.0177 |
| Example 12 | A | HCFO1224 yd/ cyclopentane | 85 | Phenolic resin foam powder | 38 | 32 | 94 | 91 | 29 | 0.22 | 965 | 0.0165 |
| Comparative Example 1 | D | HCFO1224 yd/ cyclopentane | 40 | Phenolic resin foam powder | 45 | 36 | 90 | 139 | 0 | 0.05 | 522 | 0.0190 |
| Comparative Example 2 | A | HCFO1224 yd/ cyclopentane | 40 | Nitrogen | 36 | 38 | 90 | 146 | 0 | 0.05 | 554 | 0.0193 |
| Comparative Example 3 | A | HCFO1224 yd/ cyclopentane | 40 | Phenolic resin foam powder | 34 | 28 | 93 | 90 | 31 | 0.36 | 1010 | 0.0164 |

TABLE 1-continued

| | Phenolic resin | Blowing agent | Ratio of HCFO1224 yd to be added (wt %) | Foam nucleating agent | Temperature of foamable phenolic resin composition ejected onto the lower surface material (° C.) | Density (kg/m$^3$) | Closed cell ratio (%) | Average cell diameter (μm) | Percentage of area seeped from surface material (%) | Content of HCFO-1224 yd(Z) per space volume of 22.4 × 10$^{-3}$ m$^3$ in phenolic resin foam (mol) | Surface material peeling strength at 45° angle (g) | Thermal conductivity under environment of 23° C. (W/m·K) |
|---|---|---|---|---|---|---|---|---|---|---|---|---|
| Comparative Example 4 | A | HCFO1224 yd/ cyclopentane | 40 | Phenolic resin foam powder | 46 | 40 | 84 | 151 | 0 | 0.05 | 534 | 0.0194 |

From Table 1, comparing the phenolic resin foam laminate boards obtained in Comparative Examples 1-4 and the phenolic resin foam laminate boards obtained in Examples 1-12, it can be seen that the phenolic resin foam laminate boards obtained in Examples 1-12 can satisfactory prevent the foamable resin composition from seeping out to the laminate board surface material while achieving low thermal conduction without reducing the amount of the blowing agent filled in the laminate board.

REFERENCE SIGNS LIST

1 Sample for evaluation
2 Foam portion of sample for evaluation
3 Lower surface material of sample for evaluation
4 Paper clip
5 Metal wire
6 Container
7 Clamp

The invention claimed is:

1. A phenolic resin foam laminate board in which a flexible surface material is arranged on at least one of one side of a phenolic resin foam and a back side of the one side, wherein:
the phenolic resin foam contains HCFO-1224yd(Z), is produced from a foamable phenolic resin composition, and has a density of not less than 20 kg/m$^3$ and not more than 55 kg/m$^3$, a closed cell ratio of not less than 80%, and an average cell diameter of not less than 60 μm and not more than 200 μm,
the foamable phenolic resin composition contains a phenolic resin, a surfactant, a blowing agent containing HCFO-1224yd(Z), a solid foam nucleating agent and an acid curing agent containing an organic acid,
the phenolic resin having a molecular weight of 900 to 2500,
the blowing agent is present in an amount of 4 to 11 parts by mass per 100 parts by mass of the phenolic resin and the surfactant,
the solid foam nucleating agent is present in an amount of 3 to 10 parts by mass per 100 parts by mass of the phenolic resin composition,
an area of the foamable phenolic resin composition seeping out from the surface material is 15% or less of a total area of the surface material, and
a content of HCFO-1224yd(Z) per space volume of 22.4×10$^{-3}$ m$^3$ in the phenolic resin foam is not less than 0.11 mol and not more than 0.22 mol.

2. The phenolic resin foam laminate board according to claim 1, comprising at least one gas component selected from an aliphatic hydrocarbon having a carbon number of 6 or less and a chlorinated saturated hydrocarbon having a carbon number of 5 or less.

3. The phenolic resin foam laminate board according to claim 2, wherein the surface material is any one of non-woven fabric, fabric and paper.

4. The phenolic resin foam laminate board according to claim 3, wherein a surface material peeling strength at 45° angle is 1,000 g or less.

5. The phenolic resin foam laminate board according to claim 4, wherein a thermal conductivity under an environment of 23° C. is 0.0185 W/m·K or less.

6. The phenolic resin foam laminate board according to claim 3, wherein a thermal conductivity under an environment of 23° C. is 0.0185 W/m·K or less.

7. The phenolic resin foam laminate board according to claim 2, wherein a surface material peeling strength at 45° angle is 1,000 g or less.

8. The phenolic resin foam laminate board according to claim 7, wherein a thermal conductivity under an environment of 23° C. is 0.0185 W/m·K or less.

9. The phenolic resin foam laminate board according to claim 2, wherein a thermal conductivity under an environment of 23° C. is 0.0185 W/m·K or less.

10. The phenolic resin foam laminate board according to claim 1, wherein the surface material is any one of non-woven fabric, fabric and paper.

11. The phenolic resin foam laminate board according to claim 10, wherein a surface material peeling strength at 45° angle is 1,000 g or less.

12. The phenolic resin foam laminate board according to claim 11, wherein a thermal conductivity under an environment of 23° C. is 0.0185 W/m·K or less.

13. The phenolic resin foam laminate board according to claim 10, wherein a thermal conductivity under an environment of 23° C. is 0.0185 W/m·K or less.

14. The phenolic resin foam laminate board according to claim 1, wherein a surface material peeling strength at 45° angle is 1,000 g or less.

15. The phenolic resin foam laminate board according to claim 14, wherein a thermal conductivity under an environment of 23° C. is 0.0185 W/m·K or less.

16. The phenolic resin foam laminate board according to claim 1, wherein a thermal conductivity under an environment of 23° C. is 0.0185 W/m·K or less.

* * * * *